US012774973B2

(12) United States Patent
Downey et al.

(10) Patent No.: US 12,774,973 B2
(45) Date of Patent: Oct. 27, 2026

(54) IN-SITU TEMPERATURE-CONTROLLED ACTIVE INSTRUMENTATION CAPSULE FOR MATERIALS IRRADIATION TESTING

(71) Applicant: Battelle Energy Alliance, LLC, Idaho Falls, ID (US)

(72) Inventors: Calvin Downey, Idaho Falls, ID (US); Abdalla Abou Jaoude, Idaho Falls, ID (US); William C. Phillips, Idaho Falls, ID (US); Chuting Tan Tsai, Idaho Falls, ID (US); Gregory M. Core, Idaho Falls, ID (US); Stacey M. Wilson, Idaho Falls, ID (US); SuJong Yoon, Idaho Falls, ID (US); Kim B. Davies, Moore, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 351 days.

(21) Appl. No.: 18/500,934

(22) Filed: Nov. 2, 2023

(65) Prior Publication Data

US 2024/0145108 A1 May 2, 2024

Related U.S. Application Data

(60) Provisional application No. 63/382,065, filed on Nov. 2, 2022.

(51) Int. Cl.

| | |
|---|---|
| ***G01N 25/48*** | (2006.01) |
| ***G21C 11/08*** | (2006.01) |
| ***G21C 17/112*** | (2006.01) |

(52) U.S. Cl.

CPC ......... *G01N 25/4853* (2013.01); *G21C 11/08* (2013.01); *G21C 17/112* (2013.01)

(58) Field of Classification Search

CPC ... G01N 25/4853; G21C 11/08; G21C 17/112

(Continued)

(56) References Cited

U.S. PATENT DOCUMENTS

| | | | | |
|---|---|---|---|---|
| 4,740,264 A * | 4/1988 | Naumann | ............... | C30B 29/40 117/49 |
| 10,895,519 B2 | 1/2021 | Ren | | |

FOREIGN PATENT DOCUMENTS

| | | | | |
|---|---|---|---|---|
| CN | 109507063 A * | 3/2019 | ............ | G01N 33/22 |
| CN | 112595575 A | 4/2021 | | |

(Continued)

OTHER PUBLICATIONS

Ezell et al., "Initial Irradiation Testing of Chloride Salts for Molten Salt Reactors", Conference: ANS Winter Meeting and Nuclear Technology Expo, United States, Nov. 2018, 3 pages.

(Continued)

*Primary Examiner* — Mirellys Jagan
(74) *Attorney, Agent, or Firm* — TraskBritt

(57) ABSTRACT

A temperature-controlled irradiation system may include an outer containment and a sealed capsule disposed within the outer containment. The sealed capsule may be configured to contain a testing material within the sealed capsule. The system may further include a temperature sensor disposed within the sealed capsule. The temperature sensor may be configured to measure a temperature of the testing material. A pressure sensor may be disposed within the sealed capsule. The pressure sensor may be configured to measure an internal pressure of the sealed capsule. The system may include a heater disposed within the sealed capsule. The heater may be configured to control the temperature of the testing material. The heater may be immersed within the testing material. A gas gap is provided between the sealed capsule and the outer containment. The gas gap may be (Continued)

configured to control thermal conductivity between the sealed capsule and the outer containment.

7 Claims, 8 Drawing Sheets

(58) Field of Classification Search
USPC ........................................ 374/208, 179, 141
See application file for complete search history.

(56) References Cited

FOREIGN PATENT DOCUMENTS

| | | | | | |
|---|---|---|---|---|---|
| CN | 109632523 B | | 7/2021 | | |
| CN | 113588710 A | * | 11/2021 | ............. | G01N 25/20 |
| CN | 114965567 A | * | 8/2022 | ............. | G01N 25/20 |
| GB | 2312508 A | * | 10/1997 | ........... | G01N 29/024 |

OTHER PUBLICATIONS

Ezell et al., "Neutron Irradiation of Alloy N and 316L Stainless Steel in Contact with a Molten Chloride Salt", Nuclear Engineering and Technology, vol. 53, No. 3, Mar. 2021, 13 pages.
Zhou et al., "A Simultaneous Corrosion/Irradiation Facility for Testing Molten Salt-Facing Materials", Nuclear Inst. and Methods in Physics Research B, vol. 440, (2019), 6 pages.

* cited by examiner

IN-SITU TEMPERATURE-CONTROLLED ACTIVE INSTRUMENTATION CAPSULE FOR MATERIALS IRRADIATION TESTING

CROSS REFERENCE TO RELATED APPLICATION

This application claims the benefit under 35 U.S.C. § 119(e) of U.S. Provisional Patent Application Ser. No. 63/382,065, filed Nov. 2, 2022, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The disclosure relates to materials testing devices and methods. More specifically, the disclosure relates to materials testing devices and methods for coolants and molten salts, including fueled molten salts, such as for use in advance nuclear reactors.

BACKGROUND

Nuclear energy is a promising candidate for the generation of carbon-free electricity. A notable candidate for nuclear energy is the Molten Salt Reactor (MSR). These types of reactors have nuclear fuel dissolved into a salt-based solution. This may be advantageous in terms of safety, economics, and radioactive waste reduction. Using the salt-based solution in the MSRs may include passively safe features and may not accumulate fuel irradiation damage as compared with solid fuels. MSRs may operate at relatively low pressure and high temperature, simplifying some of their components and structure. Certain types of MSRs may be configured to re-utilize spent fuel, thus helping to minimize waste generation.

However, effective use of MSRs is not without challenges. High temperature molten salts may be corrosive to structural materials of the MSRs. The accumulation of fission products may alter the chemistry within the salt (e.g., some radioactive products may precipitate or bubble out of the salt). Therefore, research regarding the performance of fueled molten salt under irradiation remains ongoing.

In conventional molten salt testing applications, a furnace heater design may be used. In a conventional furnace heater, molten salt is placed within a furnace heater or other heat source, and the molten salt is heated by a heating element outside of the molten salt. Such systems and methods may be used to control the temperature of the salt over a relatively wide range of temperatures. However, in some applications, such as for use with fueled salts, conventional furnace heaters are unsuitable.

In conventional furnace heaters where molten salt is heated from the outside, the heater and insulation surrounding the molten salt prevents heat from being effectively transferred out of the device, such as for when a fueled salt would be in a self-heating condition, e.g., while being self-heated by a fission process.

BRIEF SUMMARY

According to some embodiments, a temperature-controlled irradiation system may include an outer containment and a sealed capsule disposed within the outer containment. The sealed capsule may be configured to contain a testing material within the sealed capsule. The system may further include a temperature sensor disposed within the sealed capsule. The temperature sensor may be configured to measure a temperature of the testing material. A pressure sensor may be disposed within the sealed capsule. The pressure sensor may be configured to measure an internal pressure of the sealed capsule. The system may include a heater disposed within the sealed capsule. The heater may be configured to control the temperature of the testing material. The heater may be immersed within the testing material. A gas gap is provided between the sealed capsule and the outer containment. The gas gap may be configured to control thermal conductivity between the sealed capsule and the outer containment.

According to some embodiments, a method may include placing a sealed capsule in an outer containment in a nuclear reactor. The sealed capsule may contain a testing material formulated to achieve a molten state. The sealed capsule may be heated to a desired internal temperature. The method may further include maintaining the desired internal temperature until a testing material within the sealed capsule is in the molten state, irradiating the sealed capsule while controlling an internal temperature of the sealed capsule, and measuring the internal temperature of the testing material within the sealed capsule while irradiating.

According to some embodiments, a system for testing materials radiation testing may include a cluster for use with a nuclear reactor. The cluster may include a top cluster bail, a cluster end fitting, a dummy pin extending between the top cluster bail and the cluster end fitting, and a temperature-controlled irradiation system extending between the top cluster bail and the cluster end fitting. The temperature-controlled irradiation system may include a sealed capsule disposed within the outer containment. The sealed capsule may be configured to contain a testing material within the sealed capsule. The temperature-controlled irradiation system may also include a heater disposed within the sealed capsule. The heater may be configured to control the temperature of the testing material and may be immersed within the testing material.

DETAILED DESCRIPTION

Figure 1:
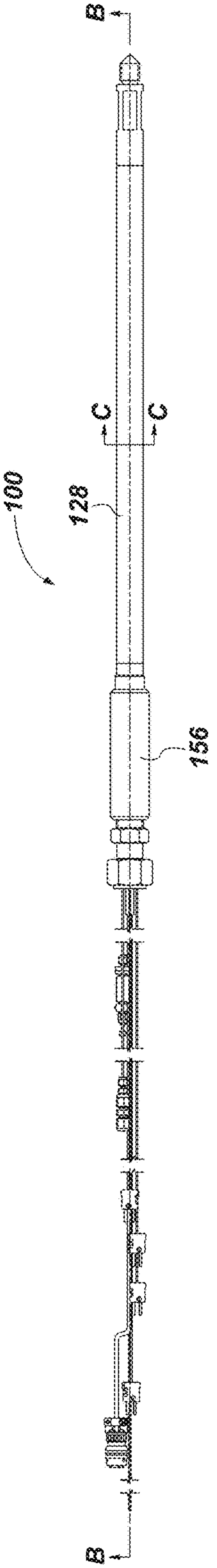
FIG. 1 is a side view of a molten-salt research temperature-controlled irradiation ("MRTI") system according to some embodiments of the disclosure.

There is a large demand in the nuclear energy sector for materials testing for advanced reactors. High temperature irradiation experiments are of interest to the nuclear industry to test advanced materials for next generation nuclear reactors. Such experiments may allow advanced nuclear reactor designs using molten salt or molten metal coolants to utilize an empirical understanding of the environmental effects of the salts or coolants on structural materials at various temperatures and under neutron irradiation. Fueled MSR designs may also utilize data on these effects as the chemistry of salt changes due to the burnup of the fuel. For example, changes in chemistry due to burnup may affect the thermal conductivity and viscosity of the salts or coolant in the reactor.

The ability to collect both in-situ and ex-situ data helps to increase the understanding of the performance of both structural materials and nuclear fuels. However, many testing apparatuses do not feature in-situ temperature control and instrumentation in an irradiation field. Very few systems are able to test a fueled salt specimen at a controlled temperature under irradiation due to the high temperatures involved. Controlling the temperature of materials in the experiment enables the fine-tuned testing of material properties and a better understanding of the environment's thermal history for a specific reactor design. Disclosed herein is a molten-salt research temperature-controlled irradiation (MRTI) system that may allow for the testing of many materials, including coolants and fueled molten salt chemistries. The MRTI system is a versatile test vehicle which, in some embodiments, may provide for the high temperature irradiation of fueled molten salts and molten metal coolants. This creates a potential for streamlining the testing of various compositions of salts and coolants (and structural materials) at a variety of temperatures.

In some embodiments, the MRTI system can utilize a capsule with an immersion heater to allow for in-situ control of testing conditions for various molten salt or molten metal systems while irradiating in a neutron flux field. In some embodiments, the MRTI capsule handles irradiated fueled molten chloride salts at an average of from about 600° C. to about 1000° C. The MRTI system may be versatile to facilitate testing of other salt compositions and other coolants. In some embodiments, the MRTI system may be configured to adjust temperature in-situ during irradiation to maintain the salt or metal in a molten state. In some embodiments, thermocouples at chosen axial and radial positions of the MRTI system may record the in-situ temperatures experienced by the materials over the course of irradiation and an optical-fiber pressure sensor may record increases in pressure inside of the capsule. In some embodiments, gas gap composition, radial radiative heat shield thickness, and a wide range of heater powers may be used to reach the desired equilibrium temperature of the system, which may be adjusted for a wide range of testing needs. In some embodiments, the MRTI system may control heat transfer and heater power in the system to provide for the testing of fueled molten salts which self-heat within the system. In some embodiments, in-situ thermal history, salt and fission off-gas pressure may be collected. In some embodiments, the MRTI system may also include post-irradiation examination (PIE) systems for collecting off-gas and retrieving desired testing samples. The MRTI system may also be used to control and monitor irradiation conditions and to withstand harsh temperature and pressure conditions, such as those within a nuclear reactor. The MRTI system may interface with current geometries of existing reactors and related equipment. The MRTI system may also be configured to integrate with post-irradiation examination ("PIE") equipment.

Figure 2:
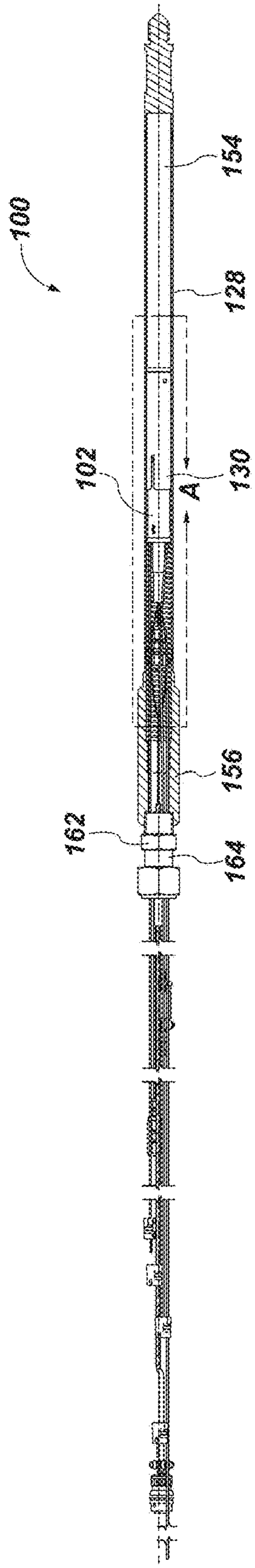
FIG. 2 is a partial cut-away view of the MRTI system taken along the line B-B in FIG. 1.
Figure 3:
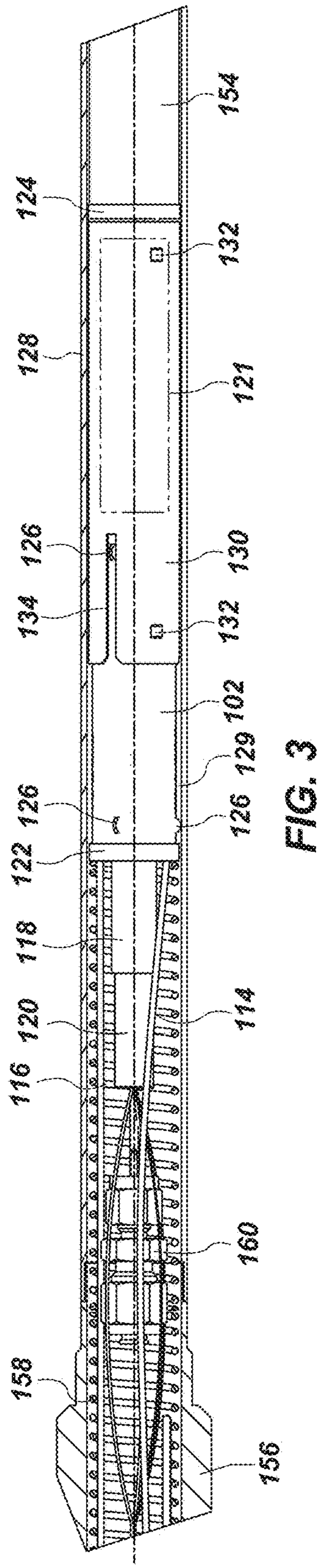
FIG. 3 is an enlarged partial view of the MRTI system designated by line A in FIG. 2.
Figure 4:
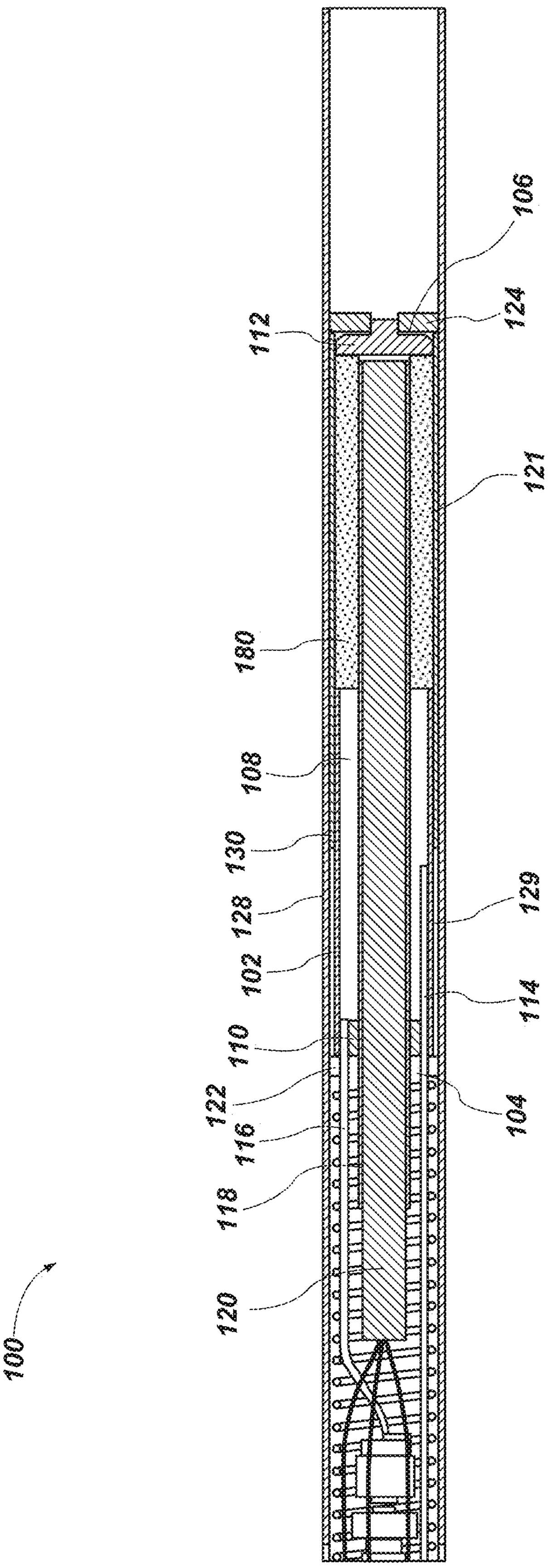
FIG. 4 is an enlarged partial section view of the MRTI system of shown in FIG. 1.
Figure 5:
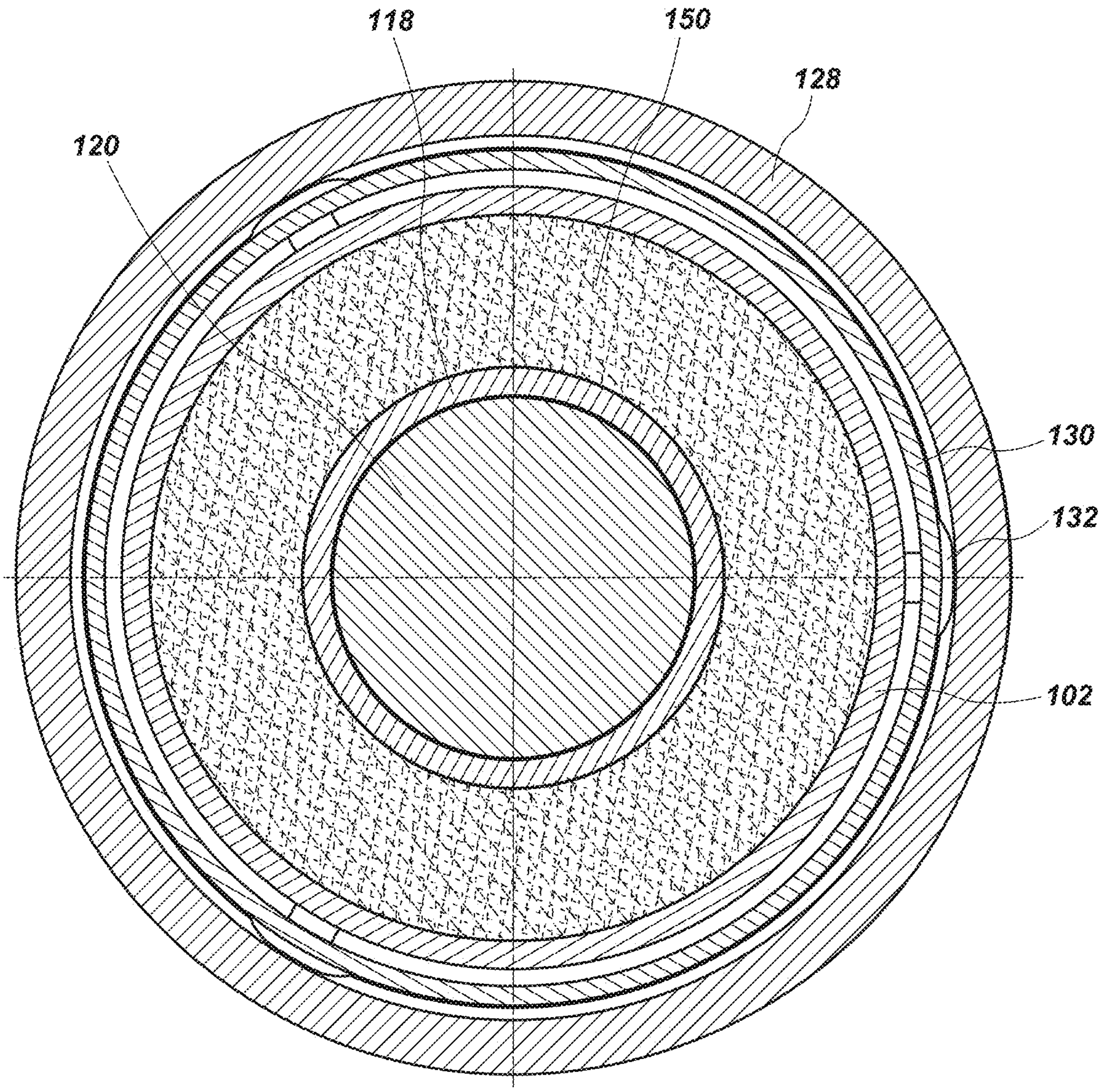
FIG. 5 is a section view of the MRTI system taken along the line C-C in FIG. 1.

FIG. 1 is a side view of a molten-salt research temperature-controlled irradiation ("MRTI") system according to some embodiments of the disclosure. FIG. 2 is a partial cut-away view of the MRTI system taken along the line B-B in FIG. 1. FIG. 3 is an enlarged partial view of the MRTI system designated by line A in FIG. 2. FIG. 4 is an enlarged partial section view of the MRTI system shown in FIG. 1. FIG. 5 is a section view of the MRTI system taken along the line C-C in FIG. 1. In FIGS. 1-5, a MRTI system may comprise a capsule 102. The capsule 102 may be configured to be sealed to house a testing material 180, as will be discussed in more detail below. The testing material 180 may be a molten salt, a fueled molten salt, a liquid metal, a fueled liquid metal, an aqueous mixture, or any other liquid nuclear fuel. In some embodiments, the testing material 180 may comprise fissile material. The capsule 102 may be comprised of any suitable material that provides sufficient mechanical strength, is operable at high temperatures, and is resistive to corrosion in a desired operating condition (e.g., operating environment). In some examples, the capsule 102 may be formed of a nickel-chromium based superalloy such as those commonly referred to by the tradename INCONEL®. In some examples, the capsule 102 may be formed from IN625 material (UNS designation N06625) with minimal tantalum content.

Figure 6C:
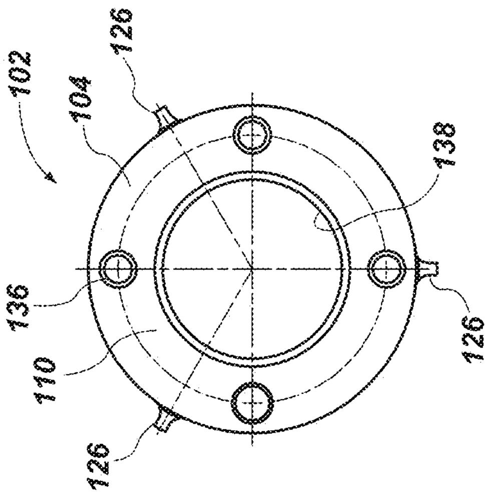
FIG. 6C is a top view of the capsule shown in FIG. 6A.
Figure 6B:
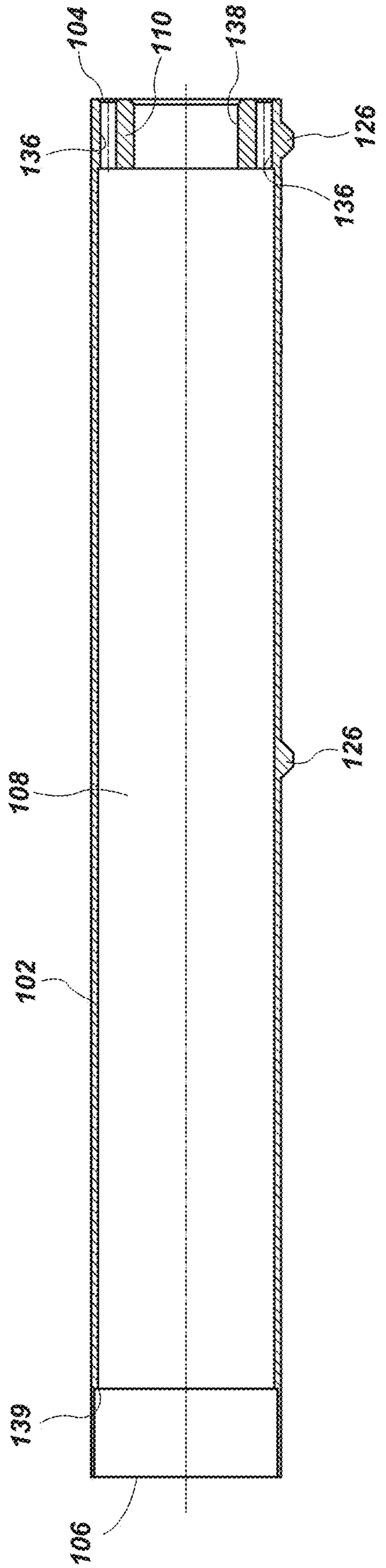
FIG. 6B is a section of the capsule shown in FIG. 6A.
Figure 6A:
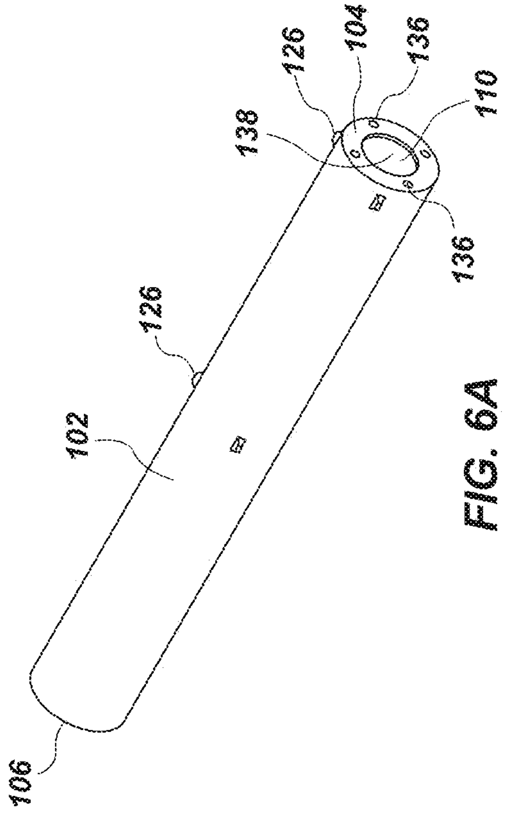
FIG. 6A is an isometric view of a capsule of the MRTI system shown in FIG. 1.

FIG. 6A is an isometric view of a capsule 102 shown in FIGS. 1-5, FIG. 6B is a section of the capsule 102 shown in FIG. 6A, and FIG. 6C is a top view of the capsule 102 shown in FIG. 6A. In some embodiments, the capsule 102 may comprise a cylindrical shape. In some embodiments, the capsule 102 may have an outer diameter of about 0.800 inches (about 2.03 cm), though other sizes may also be used. The capsule 102 may comprise a top end 104 and a bottom end 106 and may define an interior 108. The capsule 102 (as well as other components described herein) may be formed by any suitable manufacturing process. For example, the capsule 102 may be formed by a machining process, such as turning and milling processes, to form the cylindrical shape of the capsule 102 and the features thereon. In some embodiments, the capsule 102 may be formed via an additive manufacturing process. In some embodiments, various manufacturing processes may be combined to form the capsule 102.

The top end 104 of the capsule 102 may comprise a head portion 110 that is configured to facilitate the passage of various components of the MRTI system 100 therethrough to the interior 108. For example, the head portion 110 may comprise a heater aperture 138 centered in the head portion 110 and one or more feedthrough holes 136 disposed around the heater aperture 138. The heater aperture 138 may be configured to facilitate the insertion of a thermowell 118 and heater 120 into the interior 108 of the capsule 102 to heat the testing material 180 disposed therein (see FIGS. 1-5). The feedthrough holes 136 may be configured to facilitate the insertion of one or more temperature sensors such as thermocouples 114, an extension tube 116 for a pressure sensor, a gas supply line, and/or other sensors into the interior 108 of the capsule 102.

The capsule 102 may further comprise a bottom end 106 that is configured to receive an endcap 112 to seal the interior 108 of the capsule 102. The bottom end 106 of the capsule 102 may comprise a stepped portion 139 that facilitates a press fit between the endcap 112 and the capsule 102. The capsule 102 may further comprise stand-off projections 126 disposed on an outer surface of the capsule 102. The stand-off projections 126 may be configured to maintain spacing between the capsule 102 and other components of the MRTI system 100, as will be explained in more detail below.

As mentioned above, the capsule 102 may be configured to be sealed to contain the testing material 180 during operation. A brazing process may be used at the top end 104 of the capsule 102 to seal the head portion 110 of the capsule with the thermocouples 114, extension tube 116, thermowell 118, and heater 120 extending therethrough. For example, a brazing alloy, such as a nickel-based brazing alloy, may be placed on the head portion 110 of the capsule 102. The brazing alloy may be in a powder form and may comprise BNi5. The head portion 110 of the capsule 102 may be heated to melt the brazing alloy. For example, an induction braze system may be utilized, which may comprise a coil disposed around the capsule 102 at the head portion 110. The induction braze system may melt the braze alloy which may flow into the feedthrough holes 136 and heater aperture 138 and seal any gaps within the feedthrough holes 136 and heater aperture 138.

Figure 7A:
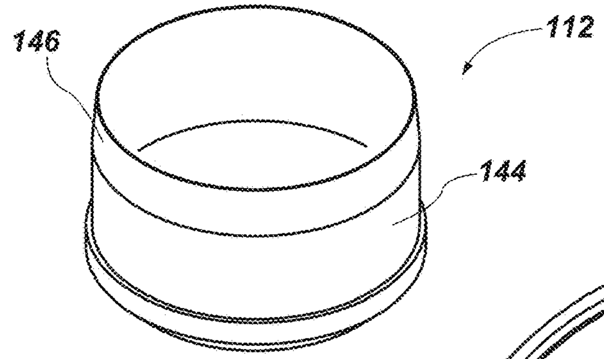
FIG. 7A is an isometric view of an endcap for a capsule of the MRTI system shown in FIGS. 6A-6B.
Figure 7B:
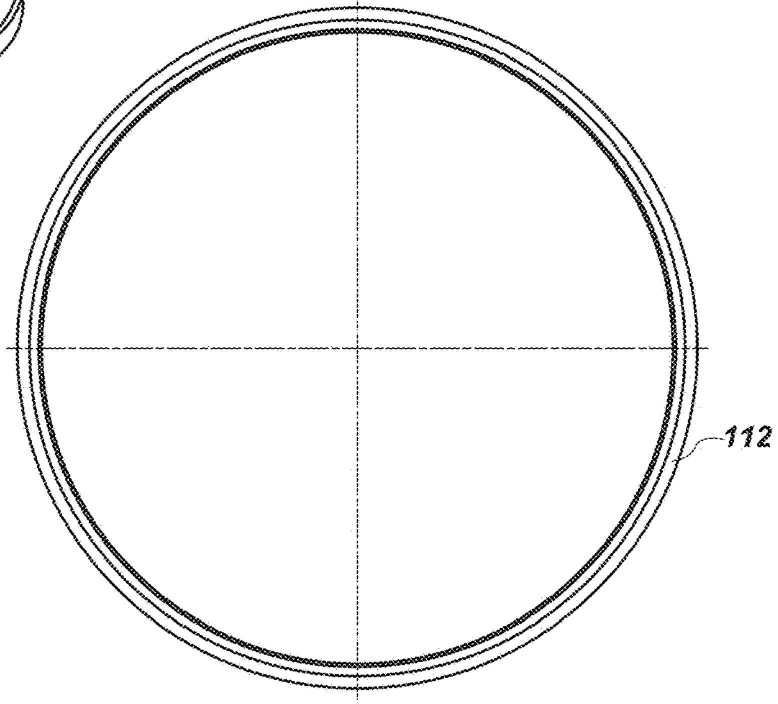
FIG. 7B is a top view of the endcap shown in FIG. 7A.
Figure 7C:
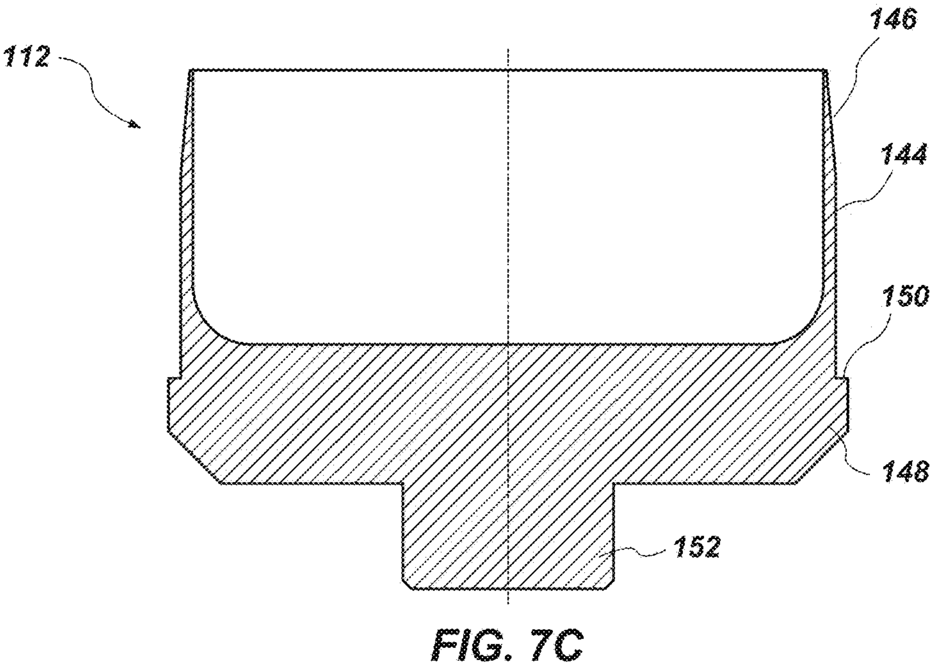
FIG. 7C is a section view of the endcap taken along the line D-D in FIG. 7B.

When the top end 104 of the capsule is sealed, the testing material 180 may be introduced into the interior 108 of the capsule 102. The bottom end 106 may then be sealed to isolate the testing material 180 inside the interior 108 of the capsule. FIG. 7A is an isometric view of an endcap for sealing a capsule of the MRTI system shown in FIGS. 6A-6B; FIG. 7B is a top view of the endcap shown in FIG. 7A, and FIG. 7C is a section view of the endcap taken along the line D-D in FIG. 7B. As shown in FIGS. 7A-7C, an endcap 112 may comprise cylindrical walls 144 having a tapered portion 146. The cylindrical walls 144 may extend from a base portion 148 of the endcap 112. The cylindrical walls 144 may fit into the bottom end 106 of the capsule 102 (see FIG. 6B). In some embodiments, the tapered portion 146 may facilitate alignment with the bottom end 106 of the capsule 102. The cylindrical walls 144 may form a press fit within the bottom end 106 of the capsule 102, and the cylindrical walls 144 may abut against the stepped portion 139 of the capsule 102.

The endcap 112 may further comprise a stepped portion 150 on the base portion 148 of the endcap 112. When the endcap 112 is inserted and press fit within the capsule 102, the stepped portion 150 may be brought into contact with the capsule 102.

To ensure a seal between the endcap 112 and the capsule 102, a laser welding process may be used at the interface of the bottom end 106 of the capsule 102 and the stepped portion 150 of the endcap 112. A laser welding device may be used and may be positioned adjacent to the interface of the bottom end 106 of the capsule 102 and the stepped portion 150 of the endcap 112, and the endcap 112 and the capsule 102 may be rotated such that the interface is welded together, sealing the endcap 112 and the capsule 102 together.

The endcap 112 may further comprise a bottom protrusion 152. The bottom protrusion 152 may be configured to help center the capsule 102 within the MRTI system 100.

The endcap 112 may be constructed of any suitable material that provides sufficient strength, is operable at high temperatures, and is resistive to corrosion in a desired operating condition. In some examples, the endcap 112 may be formed from a material similar to the capsule 102. In some examples, the capsule 102 may be formed from IN625 material with minimal tantalum content.

Returning to FIGS. 1-5 and as mentioned above, the MRTI system 100 may comprise one or more thermocouples 114. The thermocouples 114 may comprise type-N thermocouples or other suitable thermocouples having sufficient radiation resistance. The thermocouples 114 may be configured to be positioned at various axial positions within the capsule 102. For example, the thermocouples 114 may be positioned within the testing material 180 and within the interior 108 of the capsule 102 but not within the testing material 180. The thermocouples 114 may provide temperature information regarding the testing material 180 and may also be utilized as feedback for controlling the heater 120. For example, the heater 120 may be controlled to maintain the temperature monitored by one or more of the thermocouples 114 at a desired temperature or within a desired temperature range. As mentioned above, the thermocouples 114 may extend through the feedthrough holes 136 and may be sealed at the top end 104 of the capsule 102. The thermocouples 114 may be sheathed with IN625 to withstand operating conditions within the capsule 102 during use.

The MRTI system 100 may also comprise an extension tube 116 extending through and sealed within one of the feedthrough holes 136. The extension tube 116 may be connected to a pressure sensor to monitor changes in pressure within the interior 108 of the capsule 102. The pressure sensor may be any suitable pressure sensor and may be, for example, an optical fiber sensor, such as one provided by SWAGELOK®, that is connected to the extension tube 116. The extension tube 116 may be formed from or sheathed by IN625, for example, to ensure that all items in contact with the salt/coolant are of the same composition for corrosion studies.

The heater 120 may be any suitable heater configured to heat the testing material 180 within the interior 108 of the capsule 102. The heater 120 may be configured to melt the testing material 180 before irradiation and maintain the testing material 180 in a molten state following reactor shutdown to prevent solid salt hydrolysis during use. In some embodiments, the heater 120 may comprise an immersion heater having a peak wattage of about 800 W. In some embodiments, the heater 120 may comprise a peak wattage of between about 400 W and about 1000 W. The heater 120 may heat along its entire length, or the heater 120 may heat along only a portion of its length. In some embodiments, the heater 120 may heat along only a portion of its length corresponding to a region 121 in which the testing material 180 is located within the interior 108 of the capsule 102. In some embodiments, the heater 120 may comprise a height of about 7 inches (about 17.78 cm), an outer diameter of about 0.375 inches (about 0.95 cm) and is configured to heat about the bottom 3 inches (7.62 cm) of its length. Different immersion heaters with larger or smaller heated regions can be used in the thermowell depending on the application.

The heater 120 may be surrounded by a thermowell 118. The thermowell 118 may be comprised of a similar material as the capsule 102, such as IN625, to protect the heater 120 from direct contact with the testing material 180 and thus allowing the heater 120 to be immersed within the testing material 180 to heat the testing material 180 from within the testing material 180. In some embodiments, the thermowell may comprise a wall thickness of about 0.030 inches (about 0.0762 cm) and an outer diameter of about 0.435 inches (about 1.11 cm), although other sizes may be used depending on the application. The thermowell 118 may be configured to ensure conductive heat transfer therethrough from the heater 120 to the testing material 180. In some embodiments, a heat transfer cement, such as THERMON® branded heat transfer cement, may be used to ensure conductive heat transfer between the heater 120 and the thermowell 118. In some examples, the thermowell 118 may be filled with heat transfer cement, the heater 120 may be placed into the thermowell 118, and then the heat transfer cement may be cured between the thermowell 118 and heater 120. As mentioned above, the heater 120, along with the thermowell 118, may extend through and be sealed within the heater aperture 138 of the capsule 102.

Figure 8:
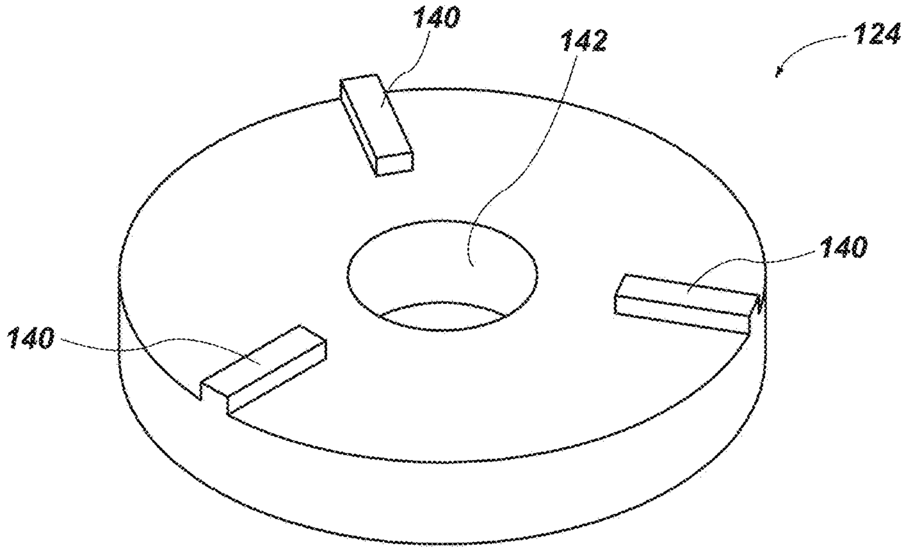
FIG. 8 is an isometric view of a bottom insulation wafer for the MRTI system shown in FIG. 1.

During use, heat transfer from the capsule 102 may be prevented in an axial direction relative to the capsule 102 so as to be controlled in a radial direction. Accordingly, a top insulation wafer 122 may be configured to be positioned adjacent to the top end 104 of the capsule 102. This top insulation wafer 122 may comprise an annular geometry and may be configured to allow routing of instrumentation through it into the upper section of the MRTI system 100. Similarly, a bottom insulation wafer 124 may be positioned adjacent to the bottom end 106 of the capsule 102. The bottom insulation wafer 124 may be configured to help center the capsule 102 within the MRTI system 100. FIG. 8 is an exemplary isometric view of the bottom insulation wafer 124 for the MRTI system 100. As shown in FIG. 8, the bottom insulation wafer 124 may comprise standoff nubs 140 formed on an upper surface thereof. The standoff nubs 140 may decrease surface contact with the bottom end 106 of the capsule 102 to limit axial heat transfer. The bottom insulation wafer 124 may further comprise a centering hole 142. The centering hole 142 may be configured to receive the bottom protrusion 152 of the endcap 112 to center the bottom end 106 of the capsule 102 within the MRTI system 100. The top insulation wafer 122 and the bottom insulation wafer 124 may be formed from any suitable insulative material such as a bisque-fired alumina material.

Figure 9:
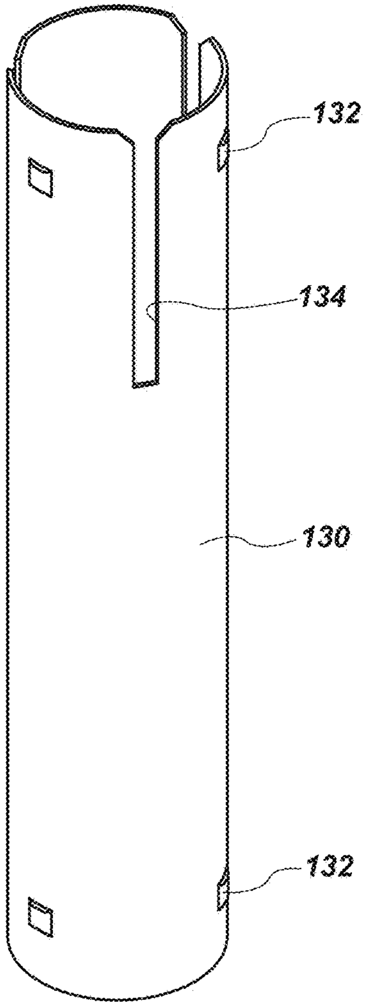
FIG. 9 is an isometric view of a heat shield of the MRTI system shown in FIG. 1.

High temperatures in the MRTI system 100 during use may result in excessive heat loss via radiative heat transfer. Therefore, in some embodiments, a radiative heat shield 130 may be positioned around the capsule 102 at the region 121 in which the testing material 180 is located within the interior 108 of the capsule 102 (see FIGS. 1-5). FIG. 9 is an isometric view of an exemplary radiative heat shield 130 of the MRTI system 100. The radiative heat shield 130 may be configured to reduce radiative heat loss directly into the MRTI system 100 and into coolant water, such as coolant water of a reactor, such as a Neutron Radiography ("NRAD") reactor. The radiative heat shield 130 may be machined out of SS316L, for example, and may be centered between the capsule 102 and an inner diameter of an outer containment 128 via standoff geometries 132. The radiative heat shield 130 may comprise a hollow cylindrical tube shape. The radiative heat shield 130 may further comprise slots 134 extending from a top of the radiative heat shield 130. The slots 134 may be configured to accommodate the stand-off projections 126 of the capsule 102.

Returning to FIGS. 1-5, as mentioned above, the MRTI system 100 may comprise an outer containment 128. The outer containment 128 may be formed in a cylindrical shape. The stand-off projections 126 of the capsule 102, the stand-off geometries 132 of the radiative heat shield 130, and the bottom protrusion 152 of the end cap 112, in combination with the bottom insulation wafer 124, may center the capsule 102 and radiative heat shield 130 relative to the outer containment 128 and may create a gas gap 129 between the outer containment 128 and the capsule 102 and radiative heat shield 130.

The gas gap 129 may be utilized to control the temperature of the testing material 180, such as salt, prior to irradiation with heating power input from the heater 120 and during irradiation with fission heat. In some examples, a gas mixture within the gas gap 129 may be utilized to control thermal conductivity from the testing material 180 to a coolant of the reactor. For example, the thickness of the gas gap 129 may be selected based on a desired thermal conductivity. Furthermore, the composition of a gas within the gas gap 129 may be selected based on the desired thermal conductivity. The gas composition may comprise inert gases such as helium and argon. In some embodiments, the gas composition may comprise a relatively higher percentage of helium in order to increase the thermal conductivity. In some embodiments, the gas composition may comprise a relatively higher percentage of argon to decrease the thermal conductivity. In some embodiments, a thickness of the gas gap 129 may be about 0.030 inches (about 0.076 cm) and a gas composition may be a mix of 85% argon and 15% helium. In some examples, one or more tubes may be provided to the gas gap 129 such as through the top insulation wafer 122 and may be configured to provide fluid communication to one or more inert gas sources to change the gas composition within the gas gap 129.

The outer containment 128 may seal the MRTI system 100 from reactor coolant water and maintain the gas composition of the gas gap 129. The outer containment 128 may be machined out of SS316L and may be configured to have an outer diameter of similar to other reactor fuel elements, such as NRAD reactor fuel elements. In some embodiments, an outer diameter of the outer containment may be 1.022 inches (2.6 cm).

In some embodiments, the MRTI system 100 may be configured such that the region 121 may be placed at an NRAD reactor fuel midplane. Accordingly, the MRTI system 100 may comprise a bottom spacer 154. The bottom spacer 154 may be comprised of a graphite material to maintain moderating material in the MRTI system 100 and to compensate for water displacement taken up by the MRTI system 100, such as in coolant water of a reactor system. In some embodiments, a high purity graphite (e.g., a nuclear grade or similar graphite) may be used in the bottom spacer 154 to reduce potential boron and ash impurities. As mentioned above, the bottom insulation wafer 124 may prevent axial heat transfer between the capsule 102 and the bottom spacer 154.

Internal components of the MRTI system 100, including the capsule 102, the top and bottom insulation wafers 122, 124, and the bottom spacer 154, may be held axially static by a compression spring 158. As mentioned above, to reduce the potential of axial heat transfer, the top insulation wafer 122 may be positioned between the compression spring 158 and the top of the capsule 102.

A top portion of outer containment 128 may increase in diameter, such as to a diameter of 1.5 inches (3.81 cm) to interface with conventional NRAD reactor fuel cluster hardware. Here, the outer containment 128 may comprise a welded fitting component 156. The welded fitting component 156 may provide a shoulder for the compression spring 158 to seat against. Instrumentation and heater leads may be routed around a fitting 160 and through an upper section of the outer containment 128 and inserted through a compression seal fitting 162 at the top of the MRTI system 100. In some examples, a potting cup 164 transitions such leads (e.g., cabling) to water-proof cabling, and the compression seal fitting 162 seals onto an outer diameter of the potting cup 164. The MRTI system 100 may be backfilled through the compression seal fitting 162 during assembly with a desired gas composition for the gas gap 129.

Figure 10:
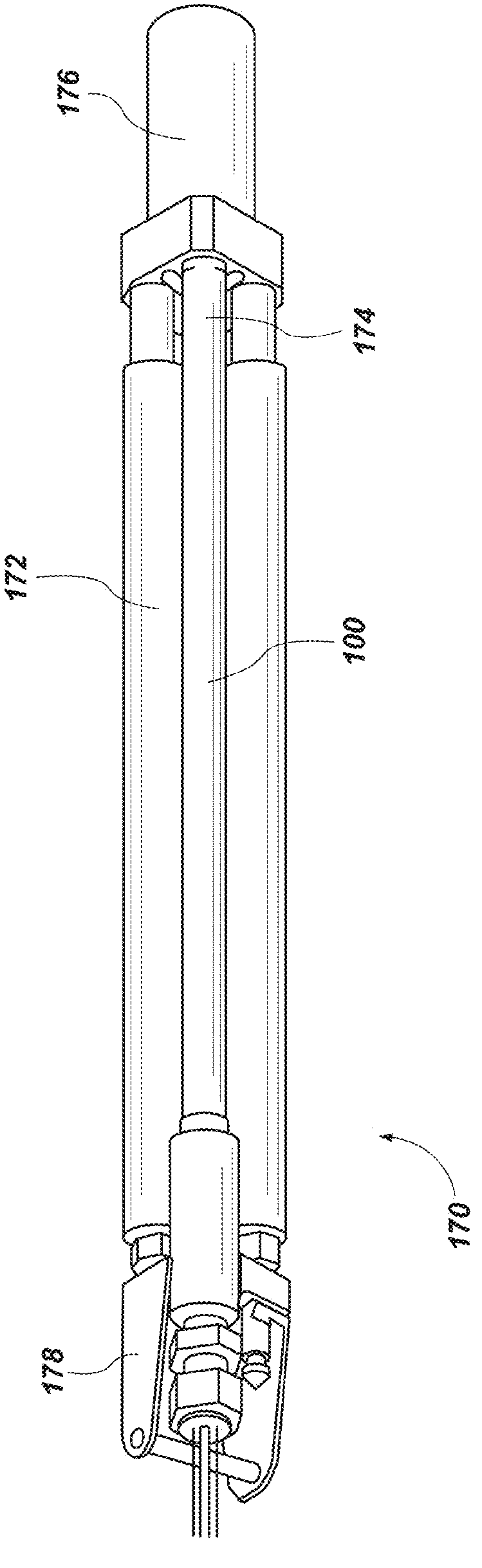
FIG. 10 is an isometric view of a cluster design including the MRTI system shown in FIG. 1.

In some embodiments, the MRTI system 100 may be installed in a typical NRAD cluster and may interface with TRIGA and AGN style fuel element clusters, which are some of the most common research reactors in the United States. FIG. 10 is an isometric view of an exemplary cluster design including the MRTI system 100. In FIG. 10, a cluster 170 may comprise the MRTI system 100. In some conventional clusters, multiple pins (e.g., four pins) are used for assembly. Accordingly, the cluster 170 may comprise one or more aluminum pins 172 acting as dummy pins in the cluster 170. The MRTI system 100 may be fitted to the cluster 170 via a MRTI bottom fitting 174. The cluster 170 may further comprise a bottom cluster end fitting 176 and a top cluster bail 178. Accordingly, the MRTI system 100 may be integrated into several existing test reactor positions, including positions of 1 inch (2.54 cm) diameter or greater.

During operation, the heater 120 may be controlled to maintain the testing material 180 within a desired temperature range. The temperature of the testing material 180 may be monitored by one or more of the thermocouples 114. For example, if the testing material 180 comprises a fueled material such as fueled salts, the heater 120 may be controlled to heat the testing material 180 to a desired temperature. When the testing material 180 undergoes irradiation and produces heat, the heater 120 may be controlled to produce less or no heat to maintain the testing material 180 at a desired temperature. The heat transfer between the testing material 180 and coolant of a reactor may be further controlled via the gas composition within the gas gap 129 between the capsule 102 and the outer containment 128.

Figure 11:
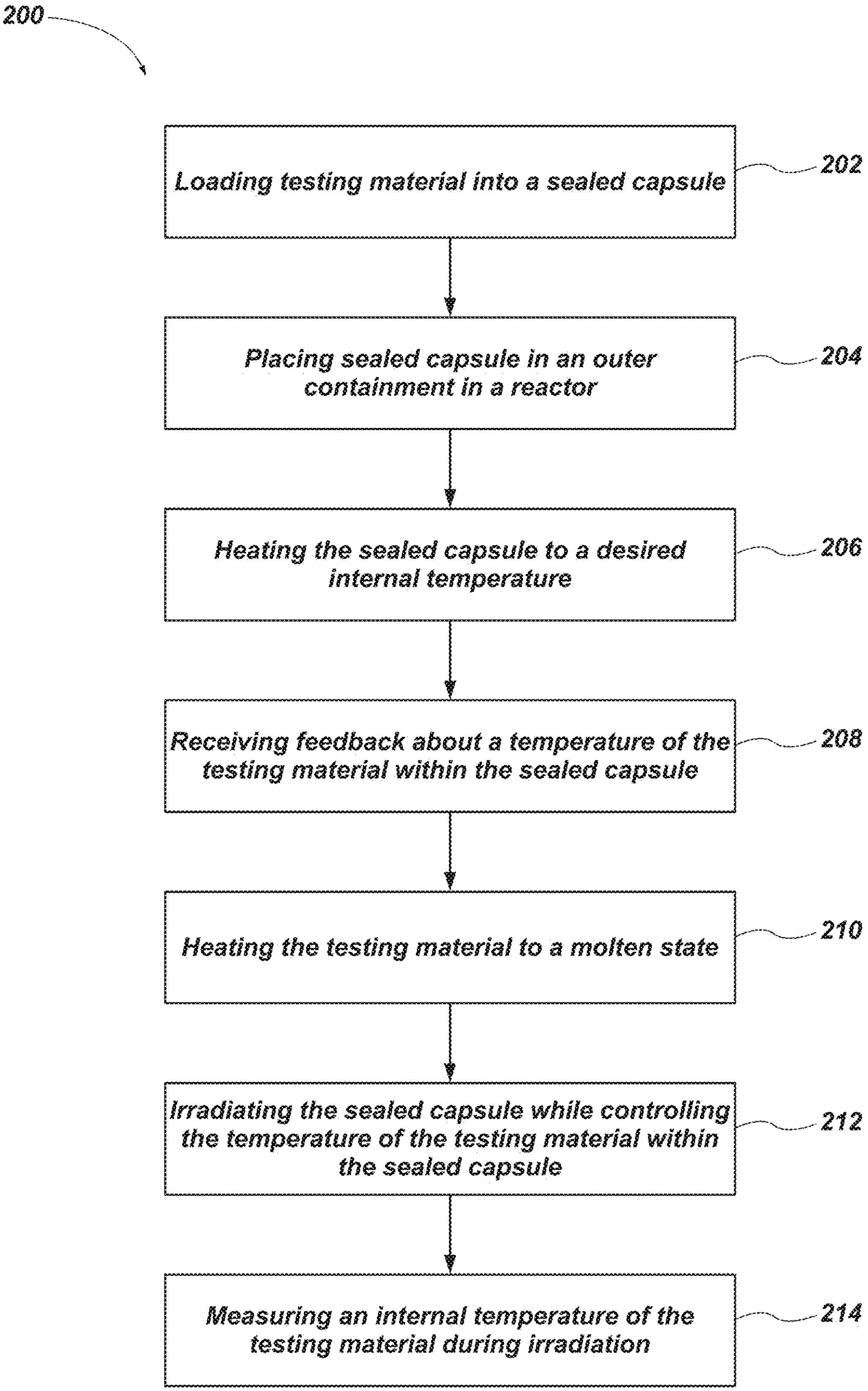
FIG. 11 is a method for materials radiation testing according to some embodiments of the disclosure.

FIG. 11 is a method 200 for materials radiation testing according to some embodiments of the disclosure. In block 202 of the method 200, testing material may be loaded and sealed into a capsule. For example, as mentioned above, the testing material 180 may be loaded into the capsule 102, and the endcap 112 may be sealed to the bottom end 106 of the capsule 102.

In block 204, the sealed capsule may be placed in an outer containment in a reactor. For example, the capsule 102 may be placed in the outer containment 128, which may then be incorporated into a cluster 170 of a reactor.

In block 206, the sealed capsule may be heated to a desired internal temperature. For example, the heater 120, which may be immersed in the testing material 180 within the capsule, may be activated to heat the interior 108 of the capsule to a desired temperature.

In block 208, feedback about the temperature of the testing material within the sealed capsule may be received. For example, thermocouples 114 within the capsule 102 may measure the temperature within the interior 108 of the capsule, including within the testing material 180.

In block 210, the material may be heated to a molten state. For example, the heater 120 immersed in the testing material 180 may heat the testing material, such as a salt or metal to be in a molten state. The thermocouples 114 may provide feedback regarding the temperature of the testing material 180 to determine whether the testing material 180 is in a molten state.

In block 212, the sealed capsule may be irradiated while controlling the temperature of the testing material within the sealed capsule. For example, the testing material 180 may be irradiated and undergo fission, which may produce heat. The thermocouples 114 may monitor the heat of testing material 180 and may adjust an output of the heater 120 to maintain the temperature of the testing material 180 at a desired temperature or within a desired temperature range.

In block 214, the internal temperature of the testing material may be measured during radiation. For example, the thermocouples 114 may monitor temperature of the testing material 180. The monitored temperature may be used for feedback control of the heater 120 or for analysis of the conditions of the testing material 180 within the capsule 102.

In some embodiments, the heater control is tuned by an advanced proportional-integral-derivative ("PID") tuning algorithm, such as one developed by Rockwell enabling precise heater control. This, coupled with cooling water of a reactor, allows for relatively good overall temperature control of the testing material 180. After irradiation is complete during a given time interval, such as for a given testing period, and the reactor is shut down, the heater 120 may be used to again heat the testing material 180, such as to heat salts into a molten condition. This post-reaction heating may facilitate post irradiation examination ("PIE") with the salts in a molten condition.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A system comprising:
- an outer containment;
- a sealed capsule disposed within the outer containment, the sealed capsule being configured to contain a testing material within the sealed capsule;
- a temperature sensor disposed within the sealed capsule, the temperature sensor being configured to measure a temperature of the testing material;
- a pressure sensor disposed within the sealed capsule, the pressure sensor being configured to measure an internal pressure of the sealed capsule;
- a heater disposed within the sealed capsule, the heater being configured to control the temperature of the testing material, and the heater being immersed within the testing material; and
- a gas gap between the sealed capsule and the outer containment, the gas gap being configured to control a thermal conductivity between the sealed capsule and the outer containment.

2. The system of claim 1, wherein the sealed capsule comprises a plurality of feedthrough holes, the temperature sensor extending through a first feedthrough hole of the plurality of feedthrough holes, and an extension tube for the pressure sensor extending through a second feedthrough hole of the plurality of feedthrough holes.

3. The system of claim 1, wherein the temperature sensor is a Type-N thermocouple and the pressure sensor is an optical fiber sensor.

4. The system of claim 1, wherein the testing material within the sealed capsule is a salt composition formulated to achieve a molten state.

5. The system of claim 1, further comprising:

a thermowell in which the heater is inserted, the thermowell and heater being immersed in the testing material, wherein the sealed capsule and thermowell comprise an IN625 material.

6. The system of claim 1, further comprising:

a radiative heat shield surrounding at least a portion of the sealed capsule.

7. The system of claim 1, wherein the sealed capsule comprises standoff projections between the sealed capsule and the outer containment.

* * * * *